United States Patent Office 3,022,294
Patented Feb. 20, 1962

3,022,294
PROCESS FOR THE SEPARATION OF GENINS FROM GLYCOSIDES
Karl Heinz Hauptmann and Karl Zeile, Ingelheim (Rhine), Germany, assignors to C. H. Boehringer Sohn, Ingelheim (Rhine), Germany, a partnership of Germany
No Drawing. Filed Sept. 23, 1958, Ser. No. 762,701
3 Claims. (Cl. 260—239.55)

This invention relates to a process for the production of steroidal-sapogenins from raw glycosides, and more particularly to a method of separating such genins from raw glycosides with the aid of certain aliphatic alcohols as extracting agents.

Raw mixtures of glycosides can be obtained from the press juices of Agaves, particularly from the press juices formed during the isolation of sisal fibers. The sapogenins, such as hecogenin, are then isolated by permitting the sisal press juices to ferment, whereby a raw glycoside mixture separates out in the form of a sediment, isolating the glycoside sediment and finally saponifying the glycoside mixture under acid conditions to liberate the sapogenins.

This known process, however, has various inherent disadvantages. The impurities present in the raw glycoside sediment give rise to the formation of gummy and resinous products during the acid saponification step. Consequently, this process yields precipitates subsequent to the saponification step which are very difficult to filter off and are very awkward to handle.

Various methods for facilitating the treatment of the saponification products have been proposed. For example, one method suggests stirring absorbents, such as animal charcoal, into the hydrolysate, or treating the same with hot sodium hydroxide and precipitating the soaps as alkali earth metal salts so as to produce more readily filterable precipitates.

Furthermore, it is known, that the raw glycoside mixture obtained from the press juice of Agaves may be extracted with methyl alcohol prior to the saponification step in order to separate the raw glycosides from the impurities. However, this method has also been found to be unsatisfactory because it necessitates the employment of large quantities of the alcohol extracting agent since the dissolving capacity of methyl alcohol is very small. Moreover, in order to recover the glycosides from the alcohol solution for the subsequent saponification step, it is necessary to evaporate the alcoholic extract to a substantial extent.

It is an object of the present invention to provide an efficient and simple method for the production of steroidal-sapogenins from raw glycoside mixtures which furnishes high yields of the desired end products.

Another object of the present invention is to provide a method of obtaining steroidal-sapogenins from raw glycosides wherein the precipitates to be filtered in various stages of the process are easy to handle and are free from gummy, and resinous products.

Still another object of the present invention is to provide a method of recovering steroidal-sapogenins from raw glycosides which obviates the necessity of evaporating the extract solution prior to saponifying the glycosides to form the sapogenins.

Various other advantages and objects of the present invention will become apparent as the description of the invention proceeds.

We have found that the disadvantages of the prior art processes are overcome and that the above indicated objects may be achieved very readily by extracting the raw glycoside sediment formed by the fermentation of the press juice with an aliphatic alcohol which is liquid at room temperature and which has a boiling point above 100° C., before subjecting the sediment to the saponification step, in order to separate the glycosides from the undesirable gumforming impurities. More particularly, the dry glycoside sediment is extracted at elevated temperatures with an aliphatic alcohol having a boiling point of more than 100° C., such as n-butyl alcohol or n-amyl alcohol, whereby the glycosides dissolve in the hot alcohol while the major amount of undesirable impurities remains behind as an insoluble residue. The surprising aspect of this method of separating the glycosides from the impurities is that upon separating and cooling the alcoholic extract solution, the glycosides re-precipitate virtually quantitatively. In other words, the extract solution does not have to be evaporated to recover the glycosides prior to subjecting them to the saponification procedure.

Thus, the process according to the present invention achieves an enrichment of the glycoside mixture and avoids the entrainment of undesirable impurities into the subsequent saponification step.

The employment of aliphatic alcohols having a boiling point above 100° C. in accordance with the present invention as extracting agents has the further advantage that they rapidly and completely extract the saponins from the glycoside sediment. The mother liquors of the extraction step may subsequently be employed for the extraction of further batches of glycoside sediment. However, after repeated use, the extraction agent must be separated from the alcohol-soluble non-saponins with which it has become enriched.

The following table shows a few experimental results which were obtained under identical conditions. The starting material in each case was the dried glycoside sediment obtained by fermentation of sisal press juice; the dried sediment contained approximately 10% by weight water.

In these tests, four 50 gm. samples of the same glycoside sediment, obtained by fermentation of sisal press juice, were each boiled first with 600 cc., then with 300 cc. and finally with 150 cc. of the alcohol indicated in column (1) of the table for one hour. The hot alcohol extract solutions from each sample were filtered on a vacuum filter, combined and the amount of alcohol-insoluble residue in each sample was determined. The weight of alcohol-insoluble residue in each instance is indicated in column (2) of the table. The combined filtrates from each sample were then cooled, whereby in all but one instance a precipitate was formed which consisted of raw saponins. The raw saponin precipitate was then separated from the respective alcohol extract solutions. The weight of this precipitate obtained from each of the four samples is recorded in column (3) of the table. The remaining respective cold alcohol extract solutions were evaporated to dryness. The dry evaporation residue from each of the four solutions consisted of a mixture of raw saponins and alcohol-soluble non-saponins. In order to determine the quantity of each component of these respective mixtures, the evaporation residues were weighed and then extracted separately with acetone, in which the saponins are insoluble while the non-saponins are soluble. Thus, the four extraction residues represented the quantity of saponins remaining dissolved in the respective cooled alcohol extract solution, while the difference between the weight of the acetone extraction residue and the weight of the evaporation residue in each case represented the amount of alcohol-soluble non-saponins. The weight of the cold-alcohol soluble raw saponins in each sample is shown in column (4) and the weight of alcohol-soluble non-saponins in each sample is shown in column (5) of the table.

TABLE I

| (1) Extracting Agent | (2) Insoluble Residue, gm. | (3) Raw Saponins Precipitated from Alcohol, gm. | (4) Raw Saponins dissolved in cold Alcohol Extract Solution, gm. | (5) Alcohol-soluble Components (Saponin-free) in Acetone Extract, gm. |
|---|---|---|---|---|
| Isopropyl alcohol, B.P.=82° C | 35.2 | 6.4 | 0.3 | 4 |
| Tertiary butyl alcohol, B.P.=82.6° C | 38.9 | (1) | 4.7 | 3.9 |
| n-butyl alcohol, B.P.=117° C | 18 | 23 | 1.4 | 4.5 |
| n-amyl alcohol, B.P.=138° C | 18.6 | 21.2 | 0.6 | 4.7 |

[1] No precipitate.

The insoluble residue remaining behind after the extraction with the alcohols having a boiling point higher than 100° C., it will be noted, has only half the weight of the residue resulting from the extraction of the sisal sediment with the alcohols having a boiling point less than 100° C. Moreover, the alcohol-insoluble residues obtained from extraction of the sisal sediment with the alcohols having a boiling point above 100° C. were found to be completely free from saponins. Consequently, the alcohols having a boiling point less than 100° C. leave a considerable quantity of the saponins undissolved. Within the limits of experimental error, therefore, the glycoside mixture obtained from fermentation of sisal press juice contains about 50% by weight of alcohol-extractable components which include the total quantity of the saponins present in the original glycoside mixture.

The raw saponins obtained in this manner are then saponified under acid conditions in accordance with well-known methods in order to produce the desired steroidal-sapogenins.

The separation of about 50% by weight of the undesirable components from the glycoside mixture by the method according to the present invention considerably facilitates the further treatment of the raw saponins. During the subsequent saponification into sapogenins, for example, no gummy, resinous products are formed and the sapogenins are readily filterable without additives and without additional treatment with alkali hydroxides.

In addition to providing a substantial simplification of the process for the manufacture of sapogenins from glycoside mixtures, the improved method according to the present invention produces considerably higher yields of the desired sapogenins, such as hecogenin, as illustrated by the following comparative data:

100 gm. samples of four different saponin-containing glycoside mixtures were worked up into sapogenins, first by the method according to Spensley (Chemistry and Industry, 1956, page 230) and then by the method according to the present invention. Each run was repeated twice. The average yield values of the three runs are listed in the table below.

TABLE II

| Sample No. | Yield of Sapogenin according to Spensley Method | Yield of Sapogenin according to method of invention | Percent increase in Yield of Sapogenin |
|---|---|---|---|
| 1 | 7.2 gm. raw hecogenin | 8.6 gm. raw hecogenin | +19 |
| 2 | 8 gm. raw hecogenin | 8.9 gm. raw hecogenin | +11 |
| 3 | 10.3 gm. raw hecogenin | 11.6 gm. raw hecogenin | +12 |
| 4 | 12.3 gm. raw hecogenin | 13.8 gm. raw hecogenin | +12 |

The use of those alcohols having a boiling point of more than 100° C., from which the raw saponins precipitate upon cooling, provides a possibility of producing sapogenins in a continuous fashion. For this purpose the alcohol extraction solvent is first heated to a temperature above 100° C. and is then passed through the raw glycoside mixture. After separating the alcohol-insoluble residue from the alcohol extract solution, the solution is cooled and the precipitated saponins are separated by filtration. The filtrate is reheated to a temperature above 100° C. and is recycled to extract more sapogenins from subsequent raw glycoside mixtures. After prolonged recycling, the extraction solvent becomes enriched with undesirable alcohol-soluble components (non-saponins) and must be entirely or partially replaced by fresh extraction solvent. The spent solvent removed from the cycle is regenerated and purified by distillation and may then be reintroduced into the cycle to take the place of spent solvent. In this manner it is therefore possible to extract considerable quantities of raw saponins from glycoside mixtures in continuous fashion with a minimum requirement of solvent. The raw saponins thus obtained are particularly easy to purify and to convert into sapogenins by acid saponification.

The following examples will further illustrate the principles set forth above and enable others skilled in the art to understand the present invention more completely. It will be understood, however, that the invention is not limited to the particular terms of these examples.

Example I 300 gm. of a raw glycoside sediment having a water content of about 10% by weight, obtained by fermentation of sisal press juice, were boiled with 3 liters of n-butanol (boiling point=117° C.) for two hours under reflux. The hot butanol solution formed thereby was filtered off from the insoluble components. The filtrate was set aside, and the filter cake was again boiled under reflux with an additional 1.5 liters of fresh butanol for two hours. The hot butanol solution was again filtered, and the filtrate was combined with the filtrate from the first alcohol extraction. The combined filtrates were allowed to cool, whereby a precipitate composed of saponins and sapogenins was formed, which was filtered off. The filtrate may be evaporated to yield an additional amount of dissolved saponins and sapogenins. The following components were obtained by the above butanol extraction procedure:

119.3 gm. butanol-insoluble components
145.4 gm. precipitated saponins and sapogenins
24.3 gm. butanol-soluble non-saponin components The 145.4 gm. mixture of purified saponins and sapogenins was admixed with 1.5 liters of 2N hydrochloric acid and the resulting mixture was boiled for 16 hours, whereby the saponins were saponified into sapogenins. The saponification reaction mixture was then filtered on a vacuum filter while still hot, and the filter cake was washed with 2–3 liters of water until free from acid. The acid-free filter cake was then suspended in 500 cc. water, and to the resulting aqueous suspension 40 cc. of 10% milk of lime were added, whereby the suspension became distinctly alkaline. The alkaline suspension was heated on a water bath for 20 minutes at 60–70° C. Thereafter, the suspension was filtered and the filter cake was washed with 2 liters of water unitl free from alkali. The filter cake was then dried and extracted with hot acetone in a Soxhlet apparatus. The acetone extracted the sapogenins, primarily hecogenin, from the filter cake. The acetone extract was allowed to cool, whereby 21 gm. raw hecogenin precipitated out which were filtered off immediately. An additional 5.1 gm. of raw hecogenin were isolated from the filtrate by evaporating the same. The total yield of raw hecogenin was 26.1 gm.

Example II 50 gm. of glycoside sediment obtained from fermented sisal press juice, as described in Example I, were exhaustively extracted with amyl alcohol in a Soxhlet apparatus. Upon cooling of the alcohol extract solution 26 gm. saponins precipitated out. The raw saponin precipitate was separated from the alcohol and was heated for 5 hours in admixture with 250 cc. of 2N—$H_2SO_4$ at a temperature of 95–100° C., whereby the saponins were saponified into sapogenins. The saponification reaction mixture was filtered while hot and the filter cake was washed with water until free from acid. Thereafter, the washed filter cake was suspended in water and the resulting suspension was made alkaline to phenolphthalein by adding 1 cc. milk of lime. The water was filtered off from the solid components of the suspension and the filter cake was washed with water until free from alkali and dried. The raw sapogenin thus obtained was then exhaustively extracted with acetone in a Soxhlet apparatus for about 5 hours. The acetone extract solution was separated and allowed to cool, whereby 3.1 gm. raw hecogenin having a melting point of 230–246° C. precipitated out. Upon evaporating the acetone extract solution, an additional 1.5 g. hecogenin having a melting point of 211–228° C. were obtained. The total yield of raw hecogenin was 4.6 gm.

*Example III*

50 gm. of a glycoside sediment from sisal, as described in the previous example, were exhaustively extracted with hot n-butanol by refluxing in a Soxhlet apparatus. The saponin-sapogenin mixture which crystallized out after cooling the extract solution was separated and saponified for 6 hours at 100° C. with 250 cc. 2N sulfuric acid. The saponification product was then washed and worked up as described in Example II. The total yield of raw hecogenin was 4.9 gm.

While the present invention has been illustrated with the aid of certain specific examples, it will be readily apparent to those skilled in the art that the invention is not limited to the specific illustrations given herein, and that various changes and modifications may be made without departing from the spirit of the invention or the scope of the appended claims.

We claim:

1. In a process of producing hecogenin from heconin-containing sisal residues which comprises allowing said sisal residues to autolyse, whereby a fermentation sediment is formed which consists essentially of a mixture of partially degraded heconin and non-saponin impurities, drying said fermentation sediment, extracting said partially degraded heconin from said dry fermentation sediment and converting the extracted partially degraded heconin into raw hecogenin by acid hydrolysis, the improvement which consists of extracting the dry fermentation sediment with a hot alkanol which is liquid at room temperature and has a boiling point of more than 100° C., said alkanol being selected from the group consisting of butanol and pentanol, whereby the partially degraded heconin goes into solution in the hot alkanol while the insoluble non-saponin impurities remain substantially undissolved, separating the hot alkanol extract solution from insoluble matter, cooling the alkanol extract solution, whereby the partially degraded heconin dissolved therein precipitates out, separating the precipitate consisting essentially of pure partially degraded heconin from the cool alkanol, and converting the partially degraded heconin contained in said precipitate into hecogenin by acid hydrolysis.

2. The process according to claim 1, wherein the alkanol used as an extraction agent is butanol having a boiling point of more than 100° C.

3. The process according to claim 1, wherein the alkanol used as an extraction agent is pentanol.

References Cited in the file of this patent

UNITED STATES PATENTS

| | | |
|---|---|---|
| 2,774,713 | Gould et al. | Dec. 18, 1956 |
| 2,827,456 | Holt et al. | Mar. 18, 1958 |

OTHER REFERENCES

Wall et al.: Jr. Biol. Chem., October 1952, pp. 533–543.

Wall et al.: Journal of the American Pharmaceutical Association, vol. XLVI, No. 3, March 1957.